(12) United States Patent
Rycyna, III et al.

(10) Patent No.: US 10,338,874 B2
(45) Date of Patent: Jul. 2, 2019

(54) MODULAR DISPLAY SYSTEM WITH AUTOMATIC LOCATING FEATURES

(71) Applicant: Cirrus Systems, Inc., Emeryville, CA (US)

(72) Inventors: Stephen David Rycyna, III, Emeryville, CA (US); Grant Elliott, Hong Kong (CN)

(73) Assignee: Cirrus Systems, Inc., Saco, ME (US)

( * ) Notice: Subject to any disclaimer, the term of this patent is extended or adjusted under 35 U.S.C. 154(b) by 276 days.

(21) Appl. No.: 15/010,368

(22) Filed: Jan. 29, 2016

(65) Prior Publication Data

US 2016/0224306 A1 Aug. 4, 2016

Related U.S. Application Data

(60) Provisional application No. 62/110,096, filed on Jan. 30, 2015.

(51) Int. Cl.
*G06F 3/14* (2006.01)
*G09G 3/32* (2016.01)
*G09F 9/302* (2006.01)

(52) U.S. Cl.
CPC ............ *G06F 3/1446* (2013.01); *G09G 3/32* (2013.01); *G09F 9/3026* (2013.01); *G09G 2300/026* (2013.01); *G09G 2330/026* (2013.01); *G09G 2356/00* (2013.01); *G09G 2370/025* (2013.01)

(58) Field of Classification Search
CPC ............... G09G 3/32; G09G 2300/026; G09G 2330/026; G09G 2356/00; G09G 2370/025; G09F 9/3026
See application file for complete search history.

(56) References Cited

U.S. PATENT DOCUMENTS

| | | |
|---|---|---|
| 6,267,462 B1 | 7/2001 | Krause et al. |
| 6,314,669 B1 | 11/2001 | Tucker |
| 6,741,222 B1 | 5/2004 | Tucker |
| 8,992,037 B2 | 3/2015 | Rycyna, III |
| 2002/0122134 A1 | 9/2002 | Kalua |

(Continued)

OTHER PUBLICATIONS

Barco, "Fixed DLiteDisplay Installation Manual" pp. 1-51, Jul. 9, 2004.

*Primary Examiner* — Stacy Khoo
(74) *Attorney, Agent, or Firm* — Caseiro Burke, LLC; Chris A. Caseiro

(57) ABSTRACT

A modular, digital LED display system is disclosed. The display system includes a modular framing system and a plurality of interchangeable display modules removably mounted in the modular framing system. Each of the display modules includes a number of light-emitting diodes (LEDs) or LED assemblies, each of which serves as an individual pixel or element of the larger digital display system. Each of the display modules also includes a number of locating or index sensors. These locating or index sensors allow each display module to determine at least whether there is another module immediately adjacent. A controller connected to the plurality of display modules receives data from the display modules, including the data from the locating or index sensors, and determines automatically the configuration of the display and the locations of the individual display modules.

18 Claims, 13 Drawing Sheets

(56) References Cited

U.S. PATENT DOCUMENTS

| | | | | |
|---|---|---|---|---|
| 2010/0085274 A1* | 4/2010 | Kilpatrick, II | ........ | G06F 1/1616 345/1.3 |
| 2012/0050314 A1* | 3/2012 | Wang | .................... | G06F 3/1446 345/619 |
| 2013/0271973 A1* | 10/2013 | Rycyna, III | ............. | F21V 19/00 362/231 |
| 2013/0293443 A1* | 11/2013 | Seo | ....................... | G06F 3/1446 345/1.2 |
| 2014/0035795 A1* | 2/2014 | Park | ..................... | G06F 3/1431 345/1.3 |
| 2015/0002371 A1* | 1/2015 | Burgess | ................... | G09G 5/12 345/1.2 |

\* cited by examiner

MODULAR DISPLAY SYSTEM WITH AUTOMATIC LOCATING FEATURES

CROSS-REFERENCE TO RELATED APPLICATIONS

This application claims priority to U.S. Provisional Application No. 62/110,096, filed Jan. 30, 2015. That application is incorporated by reference herein in its entirety.

BACKGROUND OF THE INVENTION

1. Field of the Invention

The invention relates to electronic signage and display systems.

2. Description of Related Art

Billboards and other types of large signs have long been part of the landscape in the United States and many other countries. These signs, typically outdoors, advertise products and services and are often found along highways, on buildings, and in other places that are readily viewable by the public. Traditional billboards provide static displays of printed matter that are manually placed and periodically replaced.

More recently, billboard systems have been used that feature light-emitting diodes (LEDs) and are essentially large-scale video screens capable of displaying any messages that they are programmed to display. These digital signage systems are far more versatile and can be quickly updated.

One issue is that zoning and other regulations for signage vary drastically from one jurisdiction to another. Because advertisers typically want to maximize the size of any particular sign, digital signs are typically custom ordered and custom built to meet requirements for a particular location. Since the digital signs are custom products, they often take a long time to manufacture, they are very expensive, the error cost of custom displays is very high, and replacing individual pixels or modules (i.e., the LEDs that make up the display) is difficult.

U.S. Pat. No. 8,992,037, the work of the present assignee and applicant, which is incorporated by reference in its entirety, discloses a modular display system including a modular support framework and display modules that can be mounted in the framework and easily replaced. This system has a number of advantages that are set forth in the patent. However, while a modular support framework and removable display modules solve many problems associated with traditional custom digital display systems, that arrangement creates other issues. For example, programming each of the modules with its correct position within the larger display can be difficult and time-consuming.

SUMMARY OF THE INVENTION

One aspect of the invention relates to a modular digital display system. The system comprises a modular framing system and a plurality of interchangeable display modules removably mounted within the modular framing system. Each of the display modules includes a number of light-emitting diodes (LEDs) or LED assemblies, each of which serves as an individual pixel or element of the larger digital display system. Each of the display modules also includes a number of locating or index sensors. These locating or index sensors allow each display module to determine at least whether there is another module immediately adjacent. A controller connected to the plurality of display modules receives data from the display modules, including the data from the locating or index sensors, and determines automatically the configuration of the display and the locations of the individual display modules, allowing the controller to cause each of the plurality of display modules to display a correct portion of a larger image.

Another aspect of the invention relates to a display module for a modular display system. The display module includes a number of light-emitting diodes (LEDs) or LED assemblies. Each of the display modules also includes a number of locating or index sensors. These locating or index sensors allow each display module to determine at least whether there is another module immediately adjacent. A power and data cable and an adjacent port allow the module to be connected in series (i.e., daisy chained) to other modules. In some embodiments, the locating or index sensors may be inductive proximity sensors integrated onto a printed circuit board (PCB) on which the LEDs or LED assemblies are mounted.

Yet another aspect of the invention relates to methods for automatically configuring a modular digital display system as described above. The methods include receiving positional constraint data, including proximity sensor data indicating presence or absence of adjacent modules for each interchangeable display module of a digital LED display system, and using that positional constraint data to automatically determine the relative locations of the interchangeable display modules. The proximity sensor data would typically comprise data indicating, for at least some edges of each interchangeable display module, whether another of the interchangeable display modules is proximate. In some embodiments, the positional constraint data may include position along a serial connection of display modules.

A further aspect of the invention relates to a method for managing communications with individual display modules within a larger digital LED display system. The method comprises, using a dynamic host configuration protocol (DHCP) server implemented on a controller, assigning internet protocol (IP) addresses to the individual display modules. The method also comprises breaking an image into a plurality of parts or segments corresponding to the sizes of the individual display modules and directing the individual display modules to display the parts or segments using packets of data addressed to the individual display modules using the assigned IP addresses.

Other aspects, features, and advantages of the invention will be set forth in the description that follows.

BRIEF DESCRIPTION OF THE DRAWING FIGURES

The invention will be described with respect to the following drawing figures, in which like numerals represent like features throughout the invention, and in which.

DETAILED DESCRIPTION

Figure 1:
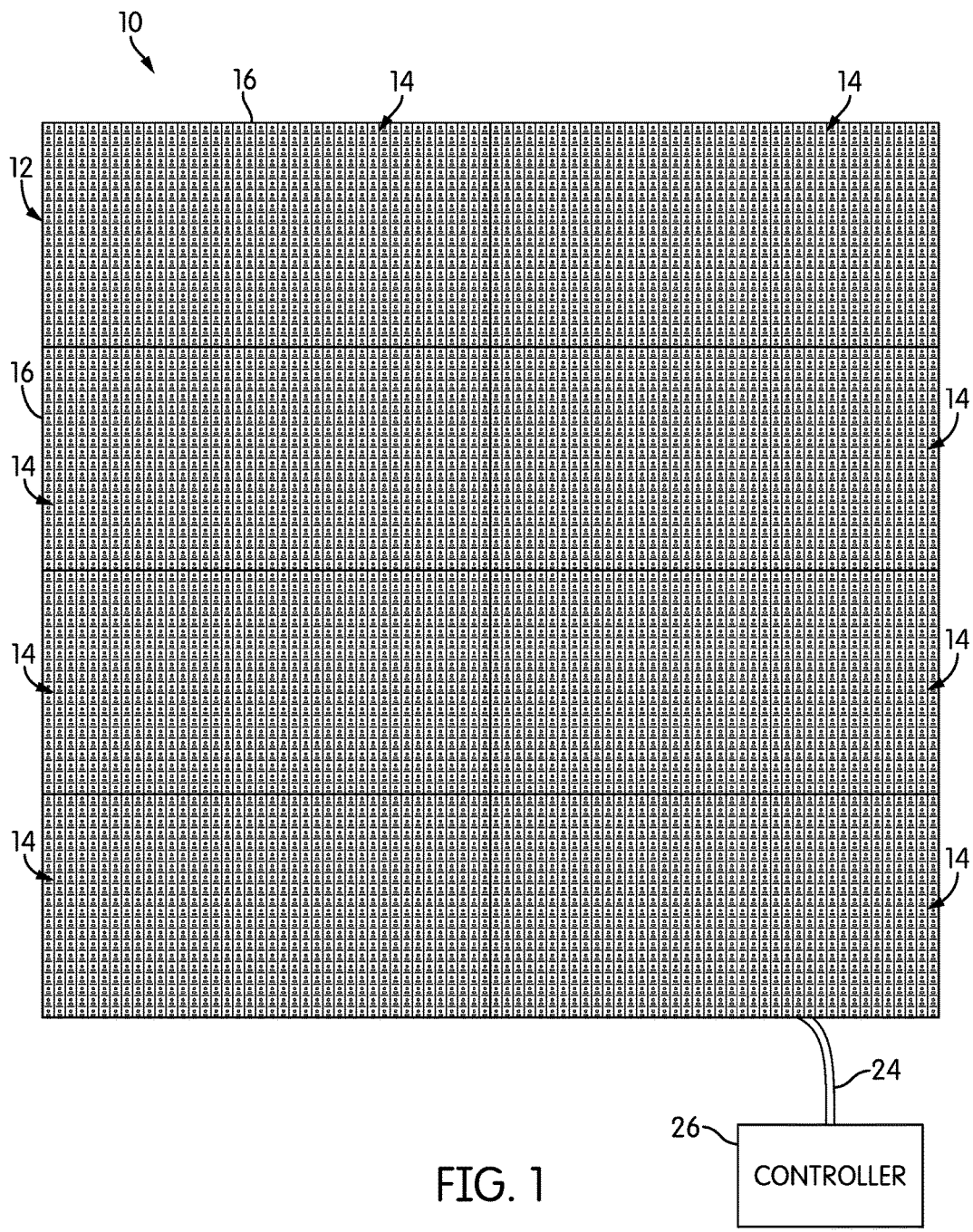
FIG. 1 is a front perspective view of a modular digital display system according to an embodiment of the invention.
Figure 2:
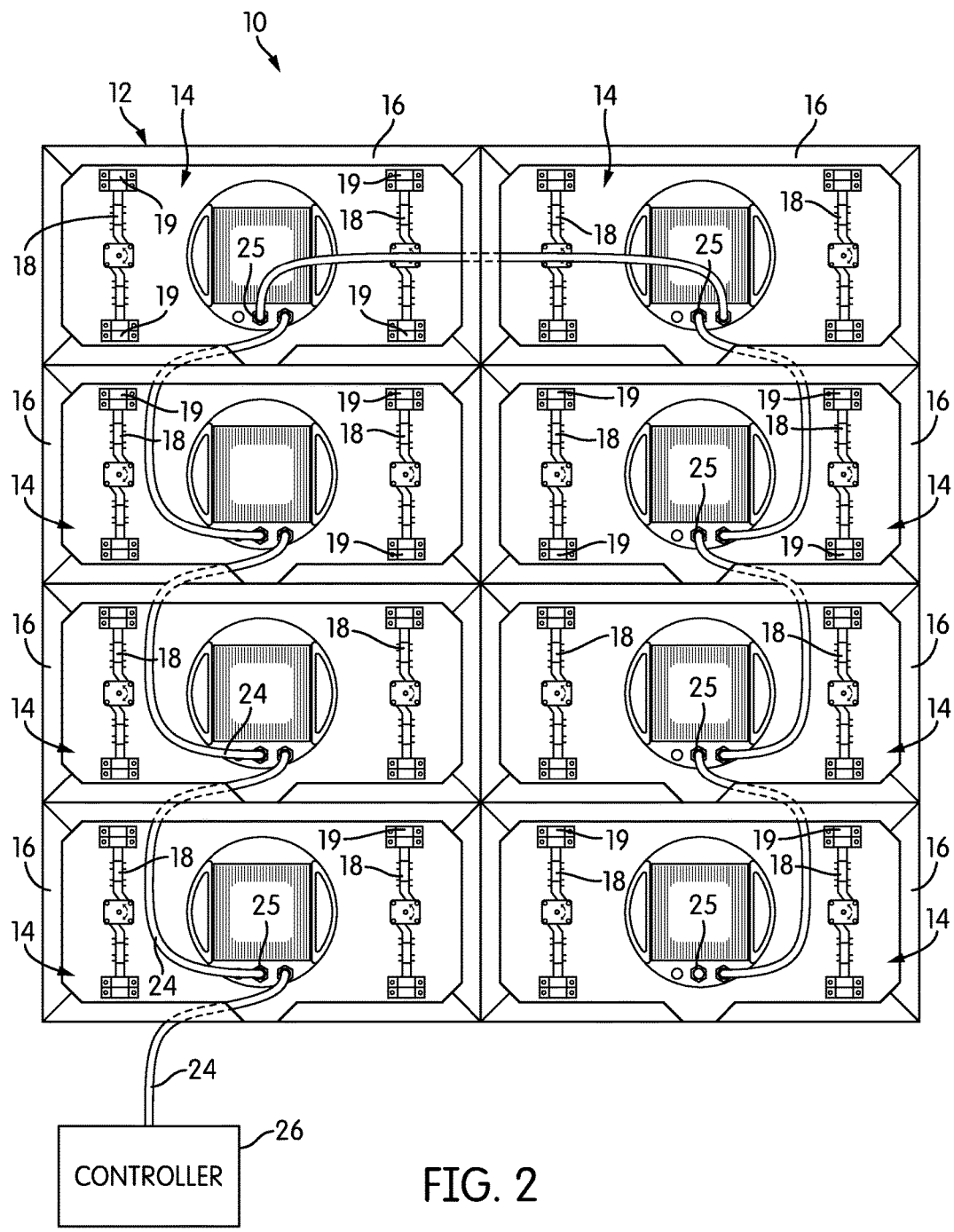
FIG. 2 is a rear perspective view of the modular digital display system of FIG. 1.

FIG. 1 is a front perspective view of a modular digital display system, generally indicated at 10, according to an embodiment of the invention, and FIG. 2 is a rear perspective view. The display system 10 comprises a modular framing system 12 and a plurality of interchangeable display modules 14. The general arrangement of a modular framing system with interchangeable display modules is described in U.S. Pat. No. 8,992,037, which was incorporated by reference above.

Briefly, the modular framing system 12 comprises a number of individual frames 16 that are secured together to form a larger structure. As can be seen in FIG. 1, the display modules 14 fit into the front of the frames 16, and are configured such that their fronts overlap the frames 16, leaving essentially no frames 16 visible in the front elevational view of FIG. 1. Thus, when viewed from the front, the modules 14 mounted in their frames 16 create a visually seamless display system 10.

As shown in the rear view of FIG. 2, the individual modules 14 have a spaced pair of quick-release engaging structures 18, essentially movable tongues that fit into complementary fittings 19 provided in the individual frames 16 that secure them releasably to the individual frames 16. The method of securement may vary from embodiment to embodiment and may include a screw or clip mechanism or a snap-locking pin, among other alternatives. Of course, it is advantageous if the method of securement allows a user to place, remove, and replace modules 14 with minimal effort and without tools.

The frames 16 themselves are typically bolted together or secured with other conventional fasteners. The frames 16 are typically made of steel or another suitable structural material. In certain cases, particularly if a display system 10 is unusually large, it may be helpful to reinforce the frames 16 with additional supporting members or structures.

Together, the modules 14 form a fixed-pixel display that can display images and video, although other types of displays may be created with this type of modular system. Each module 14 comprises a number of individual light-emitting diodes (LEDs) or LED assemblies 20. These LEDs or LED assemblies 20 may be single-color LEDs or LED assemblies capable of reproducing any of millions of colors. (Typically, an LED assembly would include red, green, and blue LEDs that can be selectively activated and at defined brightnesses or for defined times to reproduce a range of colors.) Rows of louvers 22 on the front of the module 14 shield the LEDs or LED assemblies 20 from glare and improve contrast. Each module 14 has a power and data cable 24, visible in the rear elevational view of FIG. 2, and an adjacent port 25 for connecting to a power and data cable 24 from an adjacent module 14 or from another source. The ports 25 are preferably identical among the various modules 14, and the data cable 24 may be hardwired into each module 14 or connected to a port 25 itself.

The power and data cable 24 carries both power and data signals for each module 14. In a working configuration, the modules 14 are preferably "daisy chained," or connected in series to one another, rather than each module 14 being connected separately, in parallel, to a power source. Thus, the power and data cable 24 will typically be rated to handle far more power than is required for a single module. (As one example, a single module may require 40 W of power.) Of course, modules 14 may be connected in parallel, or in any other known way, and in some embodiments, modules 14 may have separate power and data cables. If the modules 14 are in a daisy-chained configuration, the modules 14 may be configured to detect which port 25 is the data and power input port and which port 25 is the data and power output port based on the potential difference between the ports 25, providing an additional axis of symmetry.

As shown in FIGS. 1 and 2, a controller 26 is connected to the modules 14 via the power and data cables 24. Generally speaking, the controller 26 stores images and videos that are to be rendered on the display system 10, and does the work of sectioning those images and videos and instructing individual modules 14 within the display system 10 to display appropriate portions.

Display systems 10 according to embodiments of the invention may be of essentially arbitrary size, comprised of as many modules 14 and as many frames 16 as necessary to reach a desired size. As a practical matter, display systems 10 may be somewhat limited by the amount of power that can be carried by the power and data cables 24 in a daisy-chained configuration. However, that limitation can be addressed, if necessary, by providing separate power circuits for different portions of a display system 10. Similarly, if there are more modules 14 than a single controller 26 can address, multiple controllers 26 may be used. Using a single controller 26 with a single power supply and daisy-chained modules 14, 4 foot by 8 foot displays 10 are typical, and 10 foot by 20 foot displays 10 are possible with a single controller 26 and power source.

Figure 3:
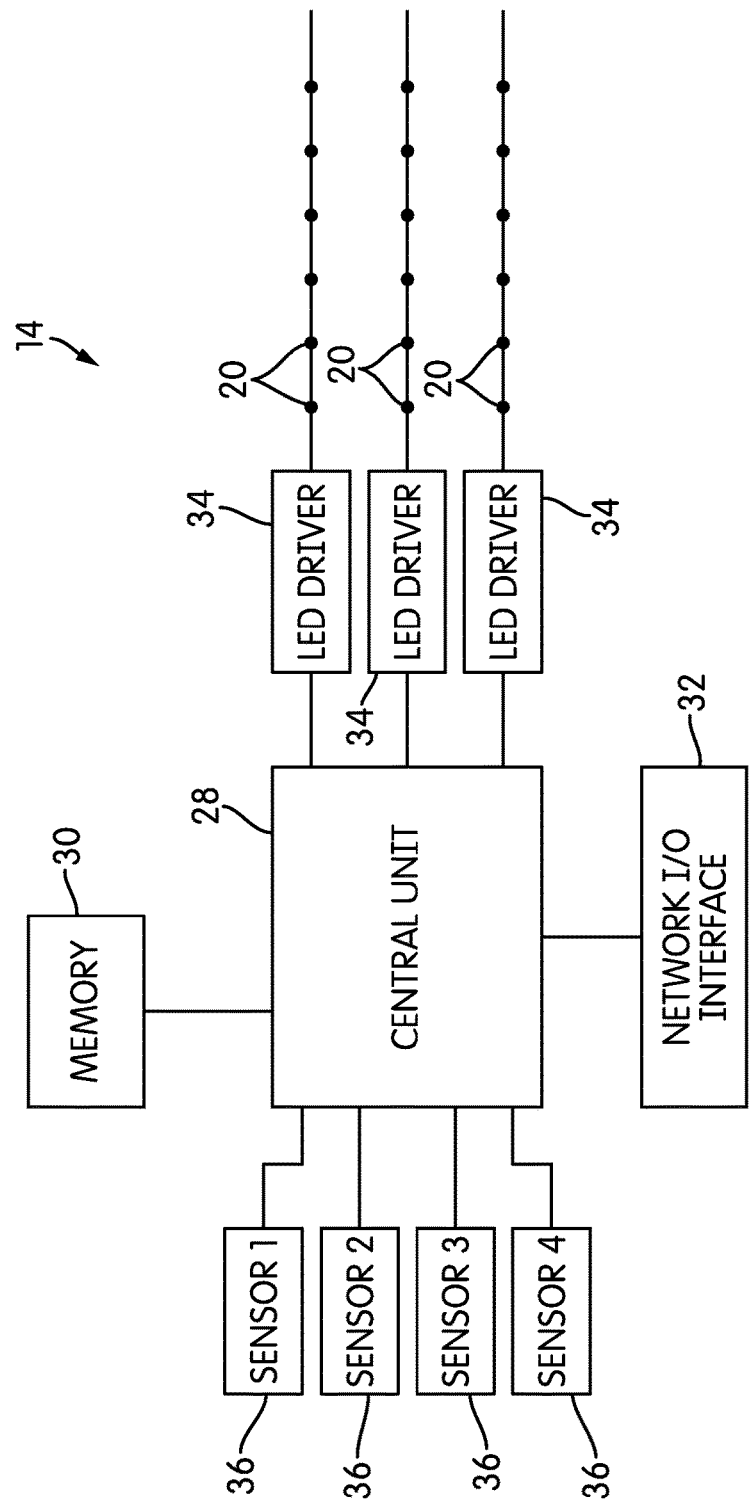
FIG. 3 is a schematic view of the components of a display module of the system of FIGS. 1 and 2.

Each module 14 has its own computing components to interpret directions from the controller 26 and drive the LEDs or LED assemblies 20. FIG. 3 is a schematic diagram of the components of a module 14. The module 14 has a central processing unit 28, which may be a microprocessor, a microcontroller, a field-programmable gate array (FPGA) or an application-specific integrated circuit, to name but a few options. Also included are memory 30, which may be any combination of random access memory (RAM), read-only memory (ROM), electrically eraseable programmable read only memory (EEPROM), flash memory, or any other type of memory, and an input-output interface. In the illustrated embodiment, the input-output interface is a network interface 32, such as an Ethernet wired network interface. Depending on the embodiment, the input-output interface may be or include a universal serial bus (USB), IEEE 1394

(FireWire), or any other type of input-output port. While these components 28, 32 are shown as being directly connected to the central unit 28 for ease in illustration, and that may be the case in some embodiments, the components may also communicate with the central unit 28 by way of a bus, as is known in the art. Power may be supplied through the power and data cable 24, or by a separate, onboard power supply, such as a set of batteries, may be provided.

In a typical embodiment, the central unit 28, memory 30, and input-output or network interfaces 32 may be combined together into a so-called "system on a chip." The module 14 would also typically include one or more LED drivers 34 that are connected to, and are directly responsible for, driving the LEDs or LED assemblies 20.

When a number of modules 14 are connected together in a serial, daisy-chained configuration, the central unit 28 and other processing components may be configured to perform some functions for the display system 10 as a whole. For example, in a simple configuration, each module 14 may receive the data stream from the controller 26, extract the instructions that pertain to it, and pass the entire, unmodified data stream on to the other modules 14, which are configured to do the same thing. In other configurations, the modules 14 may modify the data stream coming from the controller 26, for example, so as to pass on only the data that pertains to other modules 14. In some embodiments, each module 14 may create or increment a counter in the data stream, indicating the order in which the data is received, i.e., the order of the modules in the daisy chain. For example, as will be described below in more detail, the data stream may be a packetized data stream with individual data packets addressed to individual modules 14 within the display system 10, and the central processing unit 28 may be configured to extract data packets addressed to that module and to retransmit other packets.

Interchangeable display modules 14 according to embodiments of the present invention also include locating sensors that allow them to locate themselves relative to other display modules 14, which simplifies the process of initializing and programming them. These sensors may use any technology suitable for close proximity detection, e.g., in the range of about 6 inches. Suitable technologies include, but are not limited to, sound or ultrasound, infrared emitters/sensors, photodiodes and general optical sensors, laser-based sensors, RFID sensors, near field communication (NFC)-based sensors, and inductive sensors. Each of those methods may be useful for different operating conditions. These kinds of "locating" sensors may also be referred to as index sensors. Moreover, while the term "sensor" is used in this description, some of the components used for these purposes may not be active emitting or receiving electronic components. For example, in some cases, at least some of the index or locating "sensors" may be passive, non-electronic targets, like a bar code or QR code. For example, an optical scanner could scan a bar code on an adjacent module.

Figure 4:
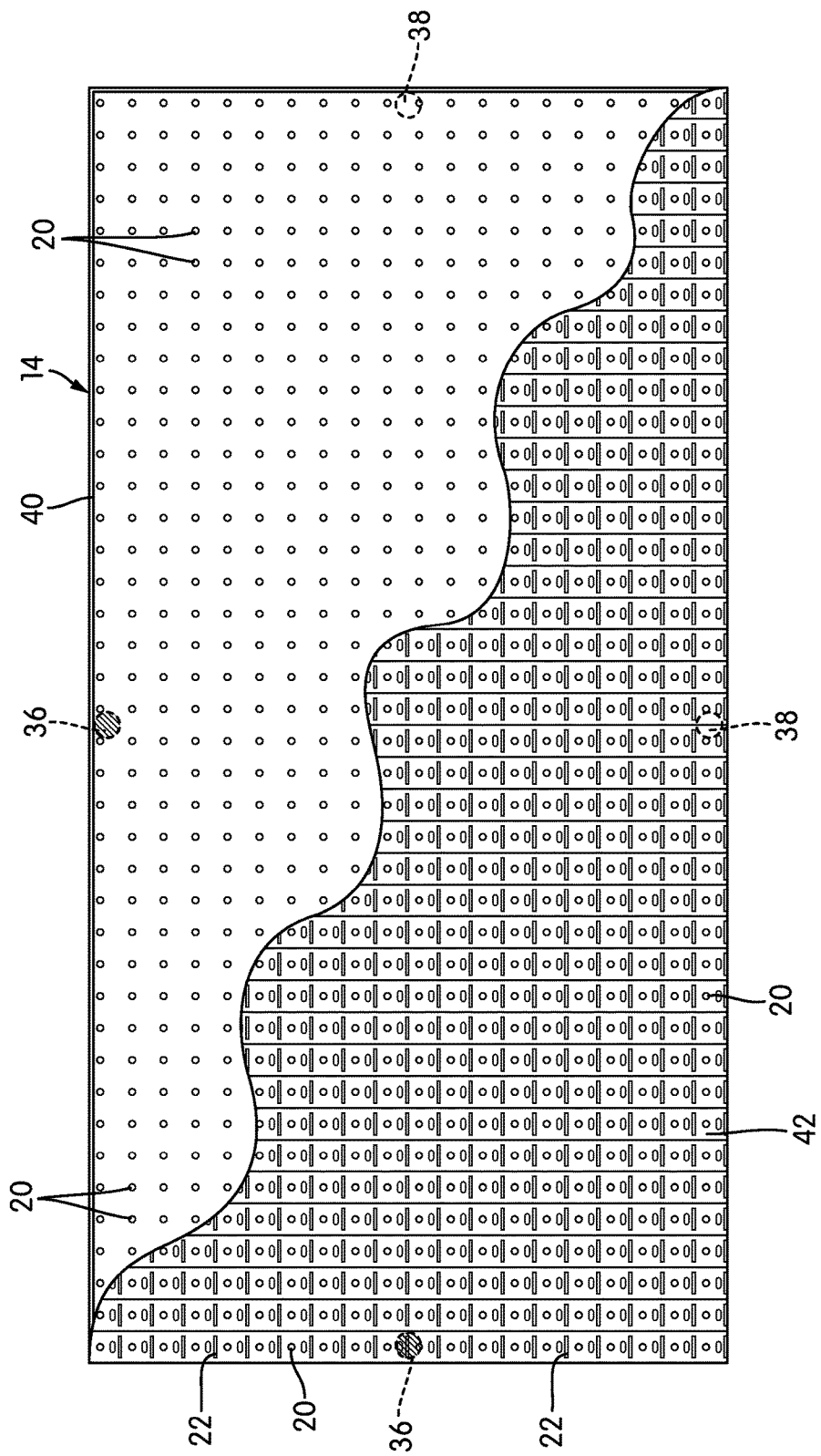
FIG. 4 is a partially cut-away front elevational view of the display module illustrating the locations of index or locating sensors in the module.

In the illustrated embodiment, as shown in FIG. 3, each module has four index sensors: two emitters 36 and two receivers 38. FIG. 4 is a partially cut-away front elevational view of one of the modules 14. As shown, the LEDs or LED assemblies 20 are mounted on a printed circuit board (PCB) 40, such as an FR4 rigid PCB, along with the other components shown in FIG. 3. The index sensors 36, 38 are typically located such that an adjacent module 14 can be detected along at least some of the side edges. Depending on the technology used, the index sensors 36, 38 may be packaged separately and connected to the PCB 40 through, for example, a surface mount connector and cable. However, it is particularly advantageous if the index sensors 36, 38 are integrated into the PCB 40, i.e., they are comprised of components mounted on the PCB 40 and connected by contact traces and vias formed in or on it.

Whether the index sensors 36, 38 are on the PCB 40 or are merely connected to it, they are usually within the casing 42 that encases each module 14. Generally speaking, the casing 42 protects the PCB 40, the LEDs 20, and the other elements of the module 14. Typically made of a plastic, the casing 42 is typically weatherproof, water resistant, and may also include heat transfer features, such as heat sinks and vents, to transfer heat to the outside. If the sensors 36, 38 require an optical line of sight or transmissibility of any particular wavelengths, the casing 42 may be provided with appropriate "windows" or transmissible areas proximate to the sensors 36, 38.

In the module 14, the index sensors 36, 38 are based on inductive proximity detection. As shown in FIG. 4, in the illustrated embodiment, an emitter 36 is positioned at the top center and at the center of the left side of the PCB 40. Receivers 38 are placed in the centers of the other two sides. While these index sensors 36, 38 may be packaged separately, as was briefly described above, they are preferably integrated onto the PCB 40 with surface-mount components.

Figure 5:
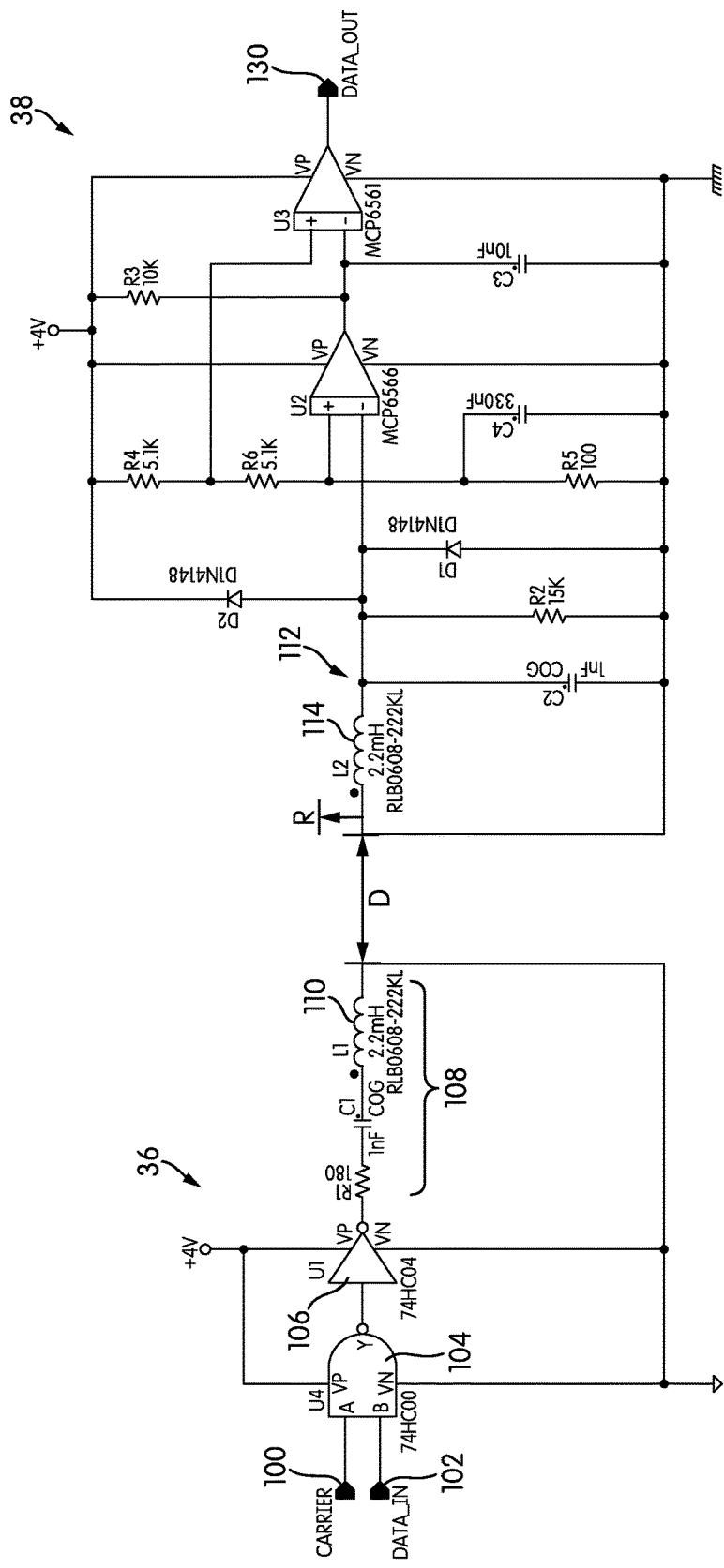
FIG. 5 is a circuit diagram of an inductive emitter/receiver index sensor pair.

FIG. 5 is a circuit diagram of an emitter 36 and a receiver 38 according to one embodiment of the invention. As is well known in the art, an inductive proximity sensor typically functions by using an inductive oscillator/electromagnetic field generator either to induce an eddy current in a passive metallic target or induce a current in another circuit. In the simplest embodiments, the receiver 38 may simply be configured and adapted to determine whether or not there is an electromagnetic field indicating that an emitter 36 is nearby. In more complex embodiments, the magnetic field created by the emitter 36 may be modulated to transfer data beyond simple presence. Of course, data transfer using the index sensors 36, 38 is an optional feature, and need not be present in all embodiments.

The emitter 36 and receiver 38 of FIG. 5 are equipped to transfer data as well as to indicate proximity. The data transfer goes in a single direction, from the emitter 36 to the receiver 38. More specifically, in the emitter 36, a carrier signal 100 and a data signal 102 are input to a NAND gate 104 and a logic inverter 106 and the resulting combined signal is used to drive an RLC circuit 108 that includes an unshielded inductor 110. When current flows to the circuit 108, an electromagnetic field is created. The receiver 38 has an RLC circuit 112, also including an unshielded inductor 114. The electromagnetic field created by the circuit 108 of the emitter 36 induces a current in the circuit 112 of the receiver 38. Current in the circuit 112 is detected, amplified, and demodulated to recover a data out signal 130. Of course, if the emitter 36 and receiver 38 are not being used for data transmission beyond proximity detection, the data out signal 130 may simply indicate the presence or absence of an adjacent module 14 and its emitter 36.

Regardless of the type of index sensors 36, 38 that are used, it is helpful if the sensors 36, 38 have a detection range of about 6 inches (15 cm), as shown by the dimension D in FIG. 5, and the energy from or operation of one set of adjacent sensors 36, 38 will not interfere with the operation of a nearby set of sensors 36, 38. As shown by dimension R in FIG. 5, there is some distance to which the electromagnetic field generated by the circuit 108 will radiate. Preferably, that distance is kept to about 1 inch (2.5 cm). Ideally, the goal is to detect that one module 14 is immediately adjacent another module 14 without creating false positives from other nearby modules that may be incorporated into a display system 10. The maximum desirable detection and radiation ranges will depend on the configuration of the frames 16 and how far apart the frames 16 hold the PCBs 40 of adjacent modules 14.

Figure 6:
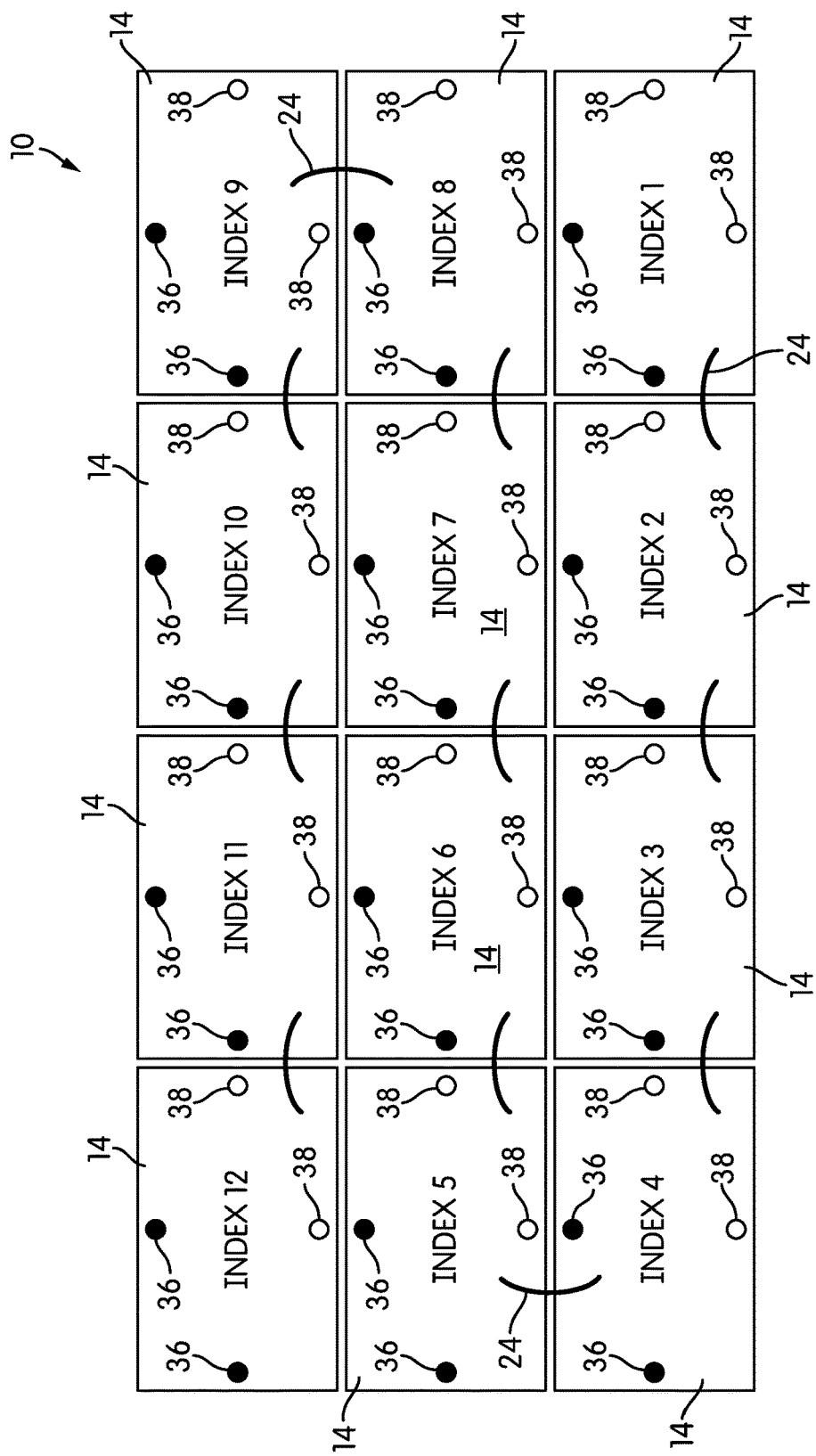
FIG. 6 is a schematic illustration of a plurality of modules in a digital display system and the locations and interactions of their index or locating sensors.

FIG. 6 is a schematic illustration of a 4×3 array of twelve modules 14, labeled "Index #1" through "Index #12" for purposes of this description. Typically, modules 14 used in display systems 10 according to embodiments of the invention will be assigned or use some sort of identifier, be it a hardware identifier built into the module 14, an identifier assigned by the controller 26, or an "index" established by the modules 14 based on their order in a daisy chain. In many embodiments, the modules 14 will use a combination of these identifiers, and others, to establish their position within the broader display systems 10.

As can be appreciated from FIG. 6, with the arrangement of index sensors 36, 38, each module 14 in the display system 10 can discern whether or not there is a module 14 below it, and whether or not there is a module 14 to its immediate right. Each module 14 will also typically be aware of its place in the daisy chain. Those pieces of data create a matrix of constraints from which the controller 26 can automatically determine the locations of the individual modules 14 in the overall display system 10. The matrix of constraints for the display system 10 of FIG. 1 is set forth in Table 1 below.

TABLE 1

Constraints for the Display System of FIG. 6

| Index # | Bottom? | Bottom Index # | Right? | Right Index # |
|---|---|---|---|---|
| 1 | No | — | No | — |
| 2 | No | — | Yes | 1 |
| 3 | No | — | Yes | 2 |
| 4 | No | — | Yes | 3 |
| 5 | Yes | 4 | Yes | 6 |
| 6 | Yes | 3 | Yes | 7 |
| 7 | Yes | 2 | Yes | 8 |
| 8 | Yes | 1 | No | — |
| 9 | Yes | 8 | No | — |
| 10 | Yes | 7 | Yes | 9 |
| 11 | Yes | 6 | Yes | 10 |
| 12 | Yes | 5 | Yes | 11 |

As an example, the data in Table 1 indicates that module 14 index #1 has no unit along its bottom edge ("Bottom? No") and no module 14 to its right ("Right? No"). Meanwhile, module 14 index #5 has module 14 index #4 below it, and module 14, index #6 to the right of it. In this situation, the location of each module 14 within the display can be automatically determined by the controller 26.

That automatic determination may rest on certain assumptions, and may use other types of constraints as well. For example, automatic determination of module location may assume that the overall display system 10 will be square or rectangular in overall shape. It may assume that the modules 14 are connected by their power and data cables 24 in one of a number of defined wiring patterns. Finally, it may assume that the positions of each of those modules 14 along a daisy chain is known, because the modules 14 communicate amongst themselves to establish their positions along the daisy chain.

Figure 7:
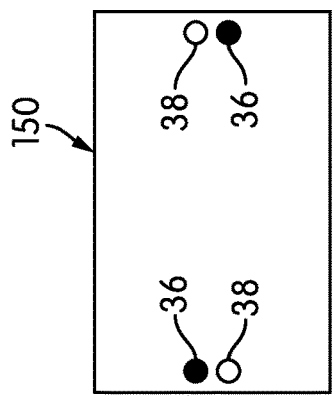
FIG. 7 is a schematic illustration of an alternate placement for index or locating sensors.

Of course, modules according to embodiments of the invention may be constructed with very different positions for index sensors 36, 38. For example, FIG. 7 is a schematic view of a module 150 with a pair of adjacent index sensors 36, 38 on the left side of the module 150 and a pair of adjacent index sensors 36, 38 on the right side of the module 150. In module 150, there are no index sensors 36, 38 along the top and bottom edges.

Figure 9:
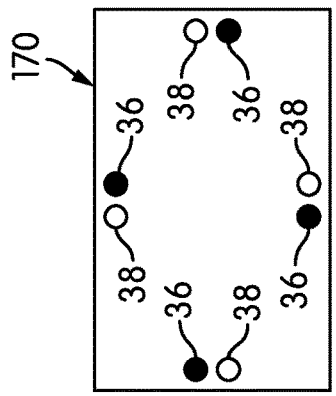
FIG. 9 is a schematic illustration of yet another alternate placement for index or locating sensors.
Figure 8:
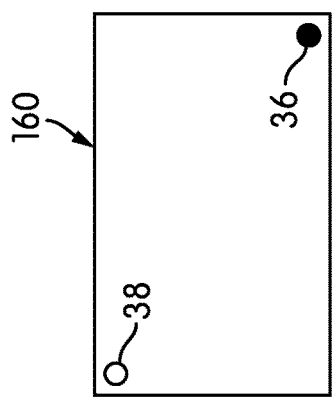
FIG. 8 is a schematic illustration of another alternate placement for index or locating sensors.

FIG. 8 is a schematic view of a module 160 with an emitter 36 at one corner and a receiver 38 at the opposite diagonal corner. Similarly, FIG. 9 is a schematic view of a module 170 with a pair of index sensors 36, 38 at the center of each edge of the module. Particularly if the display system 10 is to be an unusual shape or there is some other unusual factor in the installation, additional sensors, or sensors along each edge, may be helpful.

Depending on the types and positions of index sensors 36, 38 and the availability of other positional information on the modules 14 (daisy chain position, etc.), there may be cases in which the exact position of each module 14 is indeterminate. That is to say, there may be situations in which the information provided by the index sensors 36, 38 is sufficient to narrow the module locations down to two or more possible configurations, in which case, the user may be provided with the option to choose the correct configuration from a menu or using another type of interface or configuration parameter specified to the controller 26.

For example, take a 4×3 display system comprised of twelve modules. In this case, however, instead of the index sensors 36, 38 and the positions shown in FIG. 4, each module has index sensors sufficient to determine whether there is a module to its immediate right, and its position along a daisy chain. The constraints are set forth in Table 2 below.

TABLE 2

| Index # | Right? |
|---|---|
| 1 | No |
| 2 | Yes |
| 3 | Yes |
| 4 | Yes |
| 5 | Yes |
| 6 | Yes |
| 7 | Yes |
| 8 | No |
| 9 | No |
| 10 | Yes |
| 11 | Yes |
| 12 | Yes |

Figure 10:
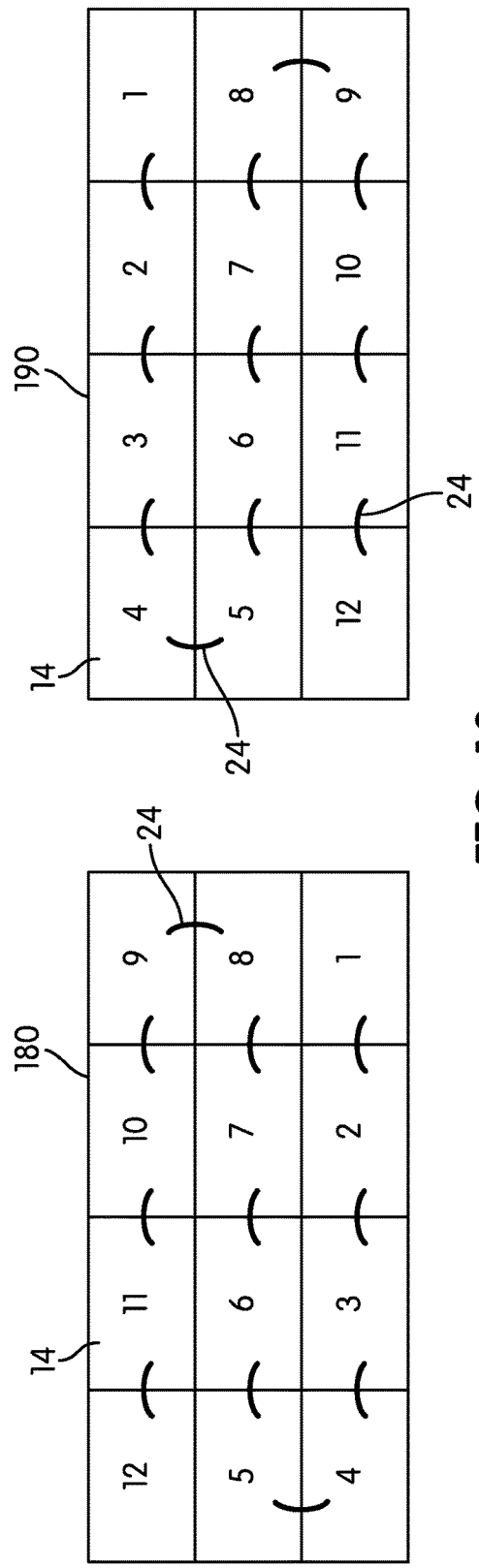
FIG. 10 is an illustration of alternative configurations for a display system with a number of display modules.

Given the constraints in Table 2, there are two possible configurations, both shown in the schematic view of FIG. 10. In configuration 180, module index #1 is on the lower right-hand corner of the display system 10. In configuration 190, module index #1 is on the upper right hand corner of the display system 10. As can be seen by comparing Table 2 with FIG. 10, both configurations 180, 190 fit the available information. Thus, the proper configuration cannot be determined fully automatically—although the controller and the modules can automatically determine two or more possible configurations that fit all of the constraints.

In a situation in which the locations of the modules 14 cannot be completely determined automatically, the controller 26 would typically be configured to present the user with the configuration options and require the user to make a choice between those configurations. This can be done with a graphical user interface (GUI) or by another mechanism, as will be described below in more detail. Of course, it is preferable if the display modules 14 contain index sensors 36, 38 (and are able to determine other constraints) sufficient to allow the controller 26 to determine the arrangement of the modules 14 without user intervention, and in most embodiments, this will be the case.

As was described briefly above, when incorporated into a display system 10, display modules 14 may use a number of different types of hardware or software identifiers in distinguishing among themselves and in routing communications from the controller 26. In one particularly advantageous embodiment, the identifiers in question are Internet protocol (IP) addresses.

Figure 11:
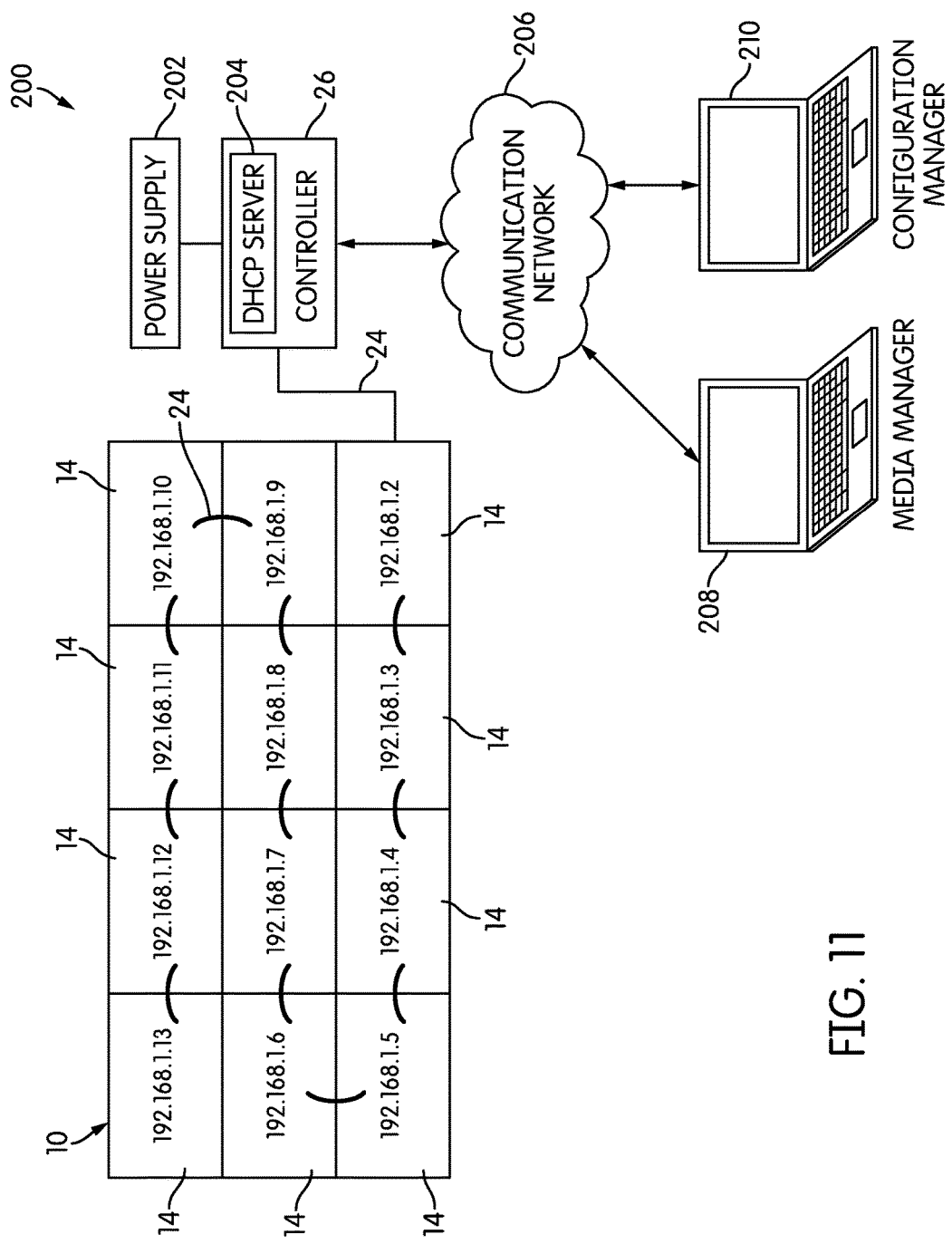
FIG. 11 is an illustration of a networked system for controlling the modular digital display system of FIG. 1.

FIG. 11 is an illustration of a system, generally indicated at 200, according to an embodiment of the invention. A display system 10 is comprised of a number of individual display modules 14, as was described above. A controller 26 is connected to the display system 10 and is itself connected to a power supply 202. The controller 26 would generally have at least most of the capabilities of a general computing system: a processor, memory, an input-output interface, etc., and may be implemented as an embedded system or system-on-a-chip. In some embodiments, the controller 26 may include or integrate a traditional desktop-type computer. Typically, the controller 26 would include a network adapter, for example, an Ethernet adapter. The traditional 8-wire twisted pairs of an Ethernet cable would be integrated into the power and data cable 24. Within each module 14, the wires that carry the network signals and data may be terminated in a standard RJ45 connector to connect to the network interface 32.

As shown in FIG. 11, the controller 26 implements a DHCP server 204 in software. The DHCP server 204 communicates over Ethernet hardware (or another appropriate physical linkage) with the network interfaces 32 of the individual modules 14 to assign the individual modules 14 IP addresses for identification and communication purposes. In essence, the controller 26 serves the role of a router, and the IP addresses it assigns will typically be private IP addresses (e.g., 192.168.x.x or 10.0.x.x), with the controller 26 equipped with firewall software and other conventional measures to block or severely limit outside network-connected devices from accessing or directing individual modules. Once IP addresses have been assigned, the modules 14 communicate with the controller 26 via traditional packet-based protocols, like TCP/IP and UDP.

The controller 26 itself is connected to a broader communication network 206, such as the Internet. This would typically be done with a hardwired (e.g., Ethernet) connection; however, the controller 26 may also be connected via a wireless (Wifi, i.e., IEEE 802.11a/b/g/n) connection or through data connection to a cellular communications network, depending on the availability and desired network configuration. Thus, through its network connection, the controller 26 is accessible so that certain outside devices can perform both setup and media management tasks, as will be described below in more detail.

In the illustrated embodiment, two separate computer systems 208, 210, both usually typical personal computers, tablet computers, or other, similar devices, are in communication with the controller 26 via the communication network 206. The configuration manager 210 handles the initial configuration and setup of the display system 10 upon installation, including the configuration of the display modules 14 and the reconfiguration or replacement of modules 14 as that becomes necessary over time. The media manager 208 is responsible for the graphics that are actually shown on the display system 10, including images and video.

As those of skill in the art will realize, a single computer system 208, 210 with appropriate client software could handle both sets of functions described above: setting the configuration and managing the media that is displayed. However, separating the functions can have some advantages. For example, the manufacturer or dealer who sold or is installing the system can handle the installation tasks—which are typically somewhat technical and closer to the hardware level—while an advertiser or advertising sales company can handle the media management functions separately and without delving into the workings of the hardware. In some cases, the applications run by the media manager 208 and the configuration manager 210 may be Web-based applications, implemented on the controller 26 or on a server and provided through the communication network 206. Web-based media and configuration management software may run either through a browser (or another general platform) or through an application that draws data from the communication network (e.g., an app on a tablet computer).

With respect to the media manager 208 itself, the software used to manage what images or video are displayed on a screen is typically resident on the media manager 208 itself. In the simplest embodiment, the media manager 208 software may be equipped to read and display image and video files of common formats. The software may then access the screen buffer of the media manager 208 and send that image to the controller 26 to be displayed. In essence, the display system 10 would mirror the screen of the media manager 208. Depending on the embodiment, the media manager 208 may also be equipped with software to re-size or alter images prior to display on the display system 10.

While the illustration of FIG. 11 shows certain basic network hardware, it should be understood that the network components, topology, and configuration may vary significantly from embodiment to embodiment. For example, although only one display system 10 is shown in FIG. 11, in many installations, there will be two back-to-back display systems 10, each capable of operating independently and displaying different messages, and each potentially having a slightly different physical configuration or number of display modules 14. If there are multiple displays that are proximate to one another, a dedicated firewall, master area controller, or other such component may be used to control and integrate the functions of all of the display systems 10.

Figure 12:
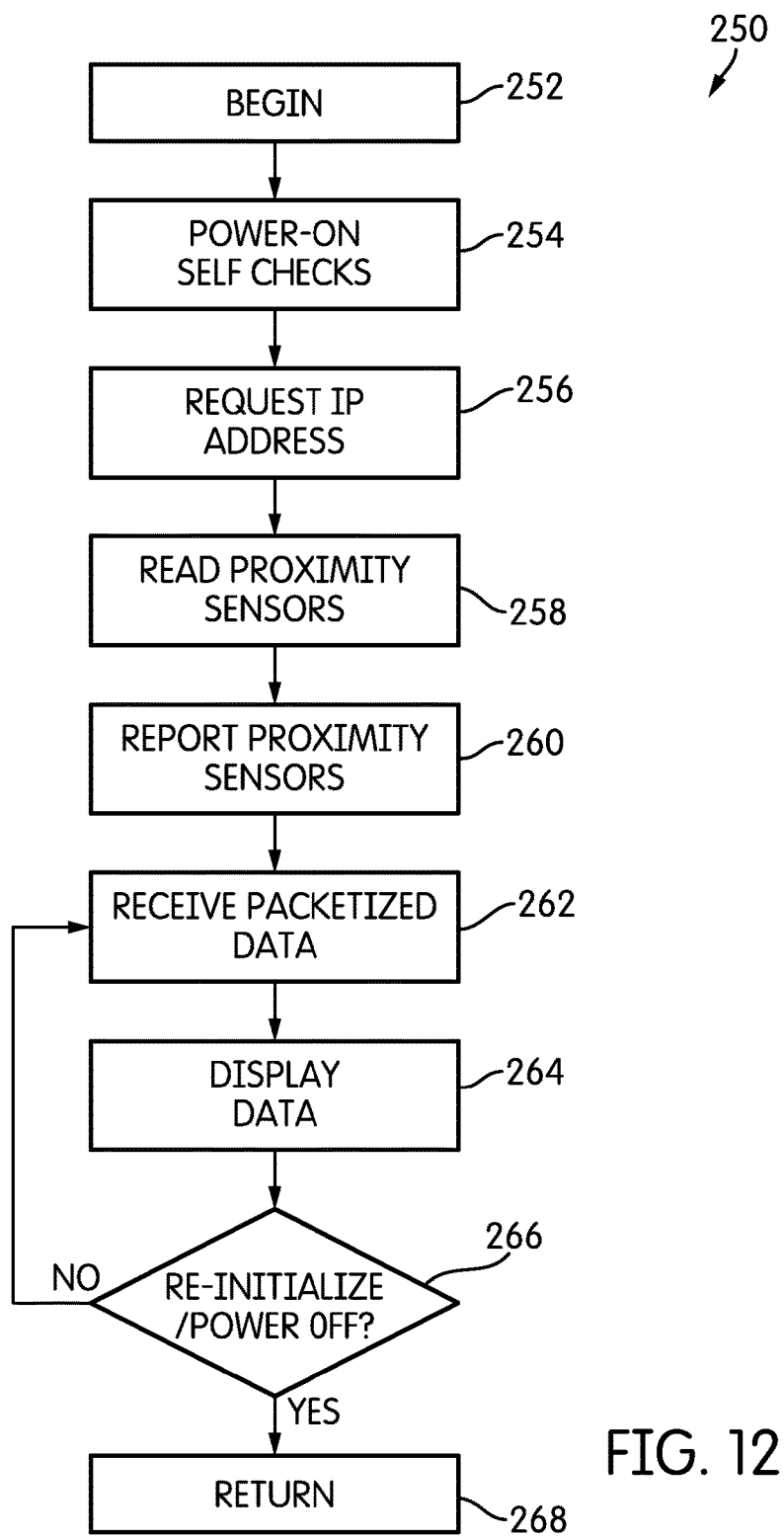
FIG. 12 is a flow diagram of a method, executed by the display modules, for receiving and displaying information over a networked interface.
Figure 13:
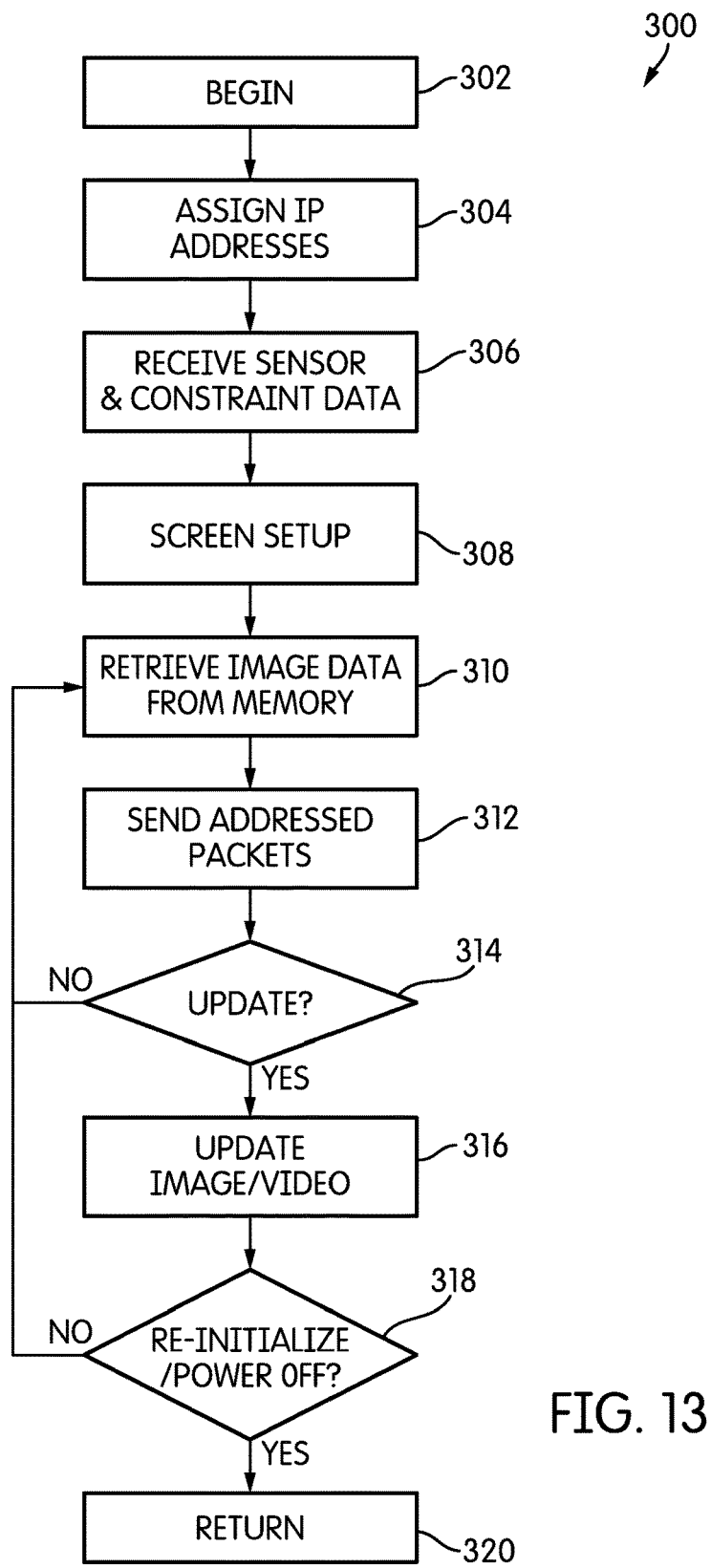
FIG. 13 is a flow diagram of a method, executed by a controller, for configuring a display system and displaying information over a networked interface.

FIG. 12 is a high-level flow diagram of a method 250, executed on each of the display modules 14, for automatically locating themselves within a larger display system 10 and for displaying image data. FIG. 13 is a high-level flow diagram of a complementary method 300, executed on the controller 26, for managing a group of display modules 14 to display images. The description of methods 200 and 300 below assumes that a number of display modules 14 are connected together in a daisy chain configuration to a controller 26. The description below also assumes that each module 14 has at least the configuration of index sensors 36, 38 shown in FIGS. 4 and 6—i.e., index sensors 36, 38 sufficient to allow the controller 26 to automatically determine the position of all of the display modules 14 in a display system 10 if the display system 10 is rectangular and satisfies certain other basic assumptions.

Method 250 begins at 252 and continues with task 254, in which each module 14 powers up and completes whatever self-checks are necessary. An indicator LED at the rear of the case may be used to indicate that the module 14 is operating normally, and different colors or operating patterns (blink, etc.) may be used to indicate that some error condition has occurred. Method 200 continues with task 256.

In task 256, the module 256 contacts the controller 26 to request an IP address. As is typical in the DHCP protocol, IP addresses are granted ad hoc and for limited amounts of time, although an address may be renewed as needed. Typically, the controller 26 will have a predefined block of addresses to assign, which, as described above, would typically be private IP addresses. Method 200 continues with task 258.

In task 258, the module 14 reads its index sensors 36, 38. In many embodiments, the data returned from the index sensors 36, 38 may simply be a binary-type "present" or "not-present" value. However, as was described above, some types of index sensors may also be able to communicate other types of data between modules, and in that case, this type of exchange may occur in task 258 or at any point thereafter.

Method 250 continues with task 260, in which the display modules 14 report their sensor data, and any other constraints of which they are aware (position in a daisy chain, etc.), to the controller 26. During task 260, or at another, similar point in method 250, each module 14 also communicates other identifying information to the controller 26, including its model or type, firmware version, and any other information useful in allowing the controller 26 to determine how many pixels the module 14 has, what the layout of those pixels is, what the module's basic configuration is, and, if needed, any color correction, calibration, or other model-specific data. Of course, in most embodiments, the controller 26 will be pre-configured to work with a limited number of models, with settings for each stored in memory, e.g., in a look-up table. In that case, each display module 16 may transmit a simple identifier string—numerical or text—in order to identify itself and its capabilities. Method 250 continues with task 262.

In task 262, having identified itself and its capabilities and having received an IP address, the module 14 begins to receive image data for display. Method 250 continues with task 264 and the module 14 displays that data as directed by the controller 26.

Task 266 of method 250 is a decision task. In task 266, if there is a re-initialization, a power loss, or some other interruption (task 266:YES), method 250 completes and returns at task 268. Otherwise (task 266:NO), method 250 returns to task 262 and continues to receive and display data.

Method 300, executed on the controller 26, begins at task 302 and continues with task 304. In task 304, the DHCP server 204 running on the controller 26 receives requests for IP addresses from the display modules 14 via DHCP and assigns those IP addresses. Method 300 continues with task 306.

In task 306, the controller 26 receives sensor and constraint data from the display modules 14. In task 306, the controller will also typically receive the other identifying information sent by each display module 14, including its model or type, firmware version, and any other information useful in allowing the controller 26 to determine how many pixels the module 14 has, what the layout of those pixels is, what the module's basic configuration is, and, if needed, any color correction, calibration, or other model-specific data. As was described above, this may take the form of a single numerical identifier or string that the controller 26 then looks up in a look-up table or another form of data repository to associate each display module 14 with a model type and characteristics. Method 300 continues with task 308.

Figure 14:
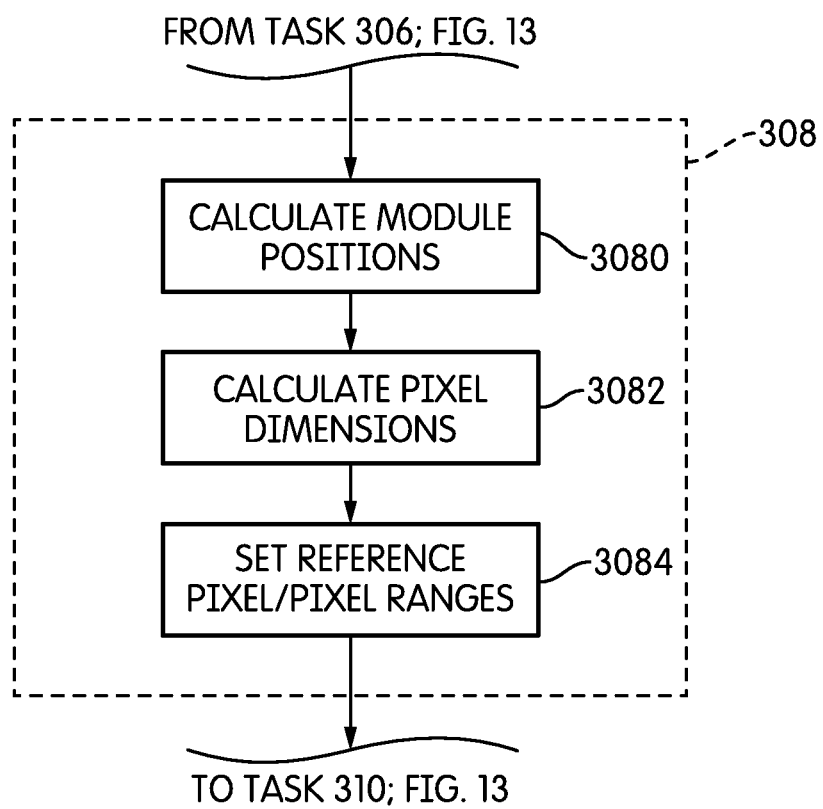
FIG. 14 is a flow diagram of one of the screen setup tasks in the method of FIG. 13.

Task 308, screen setup, has a number of sub-tasks, which are shown in the detailed flow diagram of FIG. 14, and begins at sub-task 3080. Determining the positions of the display modules 14, which was described at length above, is a part of that process, as shown in sub-task 3080. In sub-task 3080, the controller 26 considers all available information, including index sensor 36, 38 data, daisy chain position information, and any other constraints that are available in determining the positions of the individual display modules 14. During sub-task 3080, and as a result of receiving the constraint and identifying data from the modules 14 during task 306, the controller 26 will typically establish other parameters that are related to the position of the display modules 14, including the number of display modules 14 and their layout (3×3, 4×3, 3×4, etc.); the wiring pattern (i.e., the pattern by which the power and data cable 24 goes from one module to the next); and the type of modules 14. Task 308 continues with sub-task 3082.

In sub-task 3082, the controller 26 begins to establish how images and video will be mapped to individual pixels on the display system 10. Specifically, in sub-task 3082, the controller 26 may calculate the total pixel dimensions of the display system 10 by multiplying the number of pixels on each display module 14 by the respective numbers of display modules 14 along each dimension. Finally, in sub-task 3084, the controller 26 may establish a reference pixel or pixel range that corresponds to each display module 14. In other words, the controller 26 establishes which pixels (i.e., LEDs or LED assemblies 20) belong to which display modules 14.

Once the screen setup of task 308 is complete, the controller 26 then retrieves image data from memory (task 310) and then breaks up the image according to the reference pixels or pixel ranges that were previously established and, as shown in task 312, can then begin to send image data to the display modules 14 for display. Since the display modules 14 all have IP addresses, this is typically done by sending packets addressed to the IP addresses associated with the individual modules 14. The display system 10 may be driven in a multiplexed fashion, such that only a portion of the display is actively addressed and changed at a time, but persistence of vision makes it appear that the entire display is continuously active. In that case, the controller 26 would simply send out packets fast enough, thus cycling the display fast enough, that the human eye does not notice the difference. Method 300 continues with task 314.

Task 314 of method 300 is a decision task. As those of skill in the art will appreciate, once a display system 10 begins displaying data, it can continue doing so for an arbitrary amount of time, stopping or changing only when there is an update to the image or video being displayed, or when there is some need to shut down or re-initialize. In task 314, if there is an update (task 314:YES), method 300 continues with task 316. If there is no update (task 314:NO), control of method 300 returns to task 310 and the controller 26 continues sending image data to the display modules 14 in packets.

In task 316, the controller 26 updates the image or video being shown, and continues in task 318, another decision task, to determine whether there is any need to re-initialize or power off. If there is no need to do either (task 318:NO), control of method 300 returns to task 310, and the controller 26 continues to send image data to the display modules 14 in packets. Otherwise (task 318:YES), method 300 completes and returns at task 320.

Together, the display modules 14, modular framing system 16, index sensors 36, 38, and methods 200, 300 of using them allow for the creation of large, modular digital LED display systems 10 that can automatically configure themselves to work as a unified whole.

While the controller 26 and display modules 14 cooperate to initialize themselves, there may be situations in which a user desires or needs to manually configure the modules 14.

Figure 15:
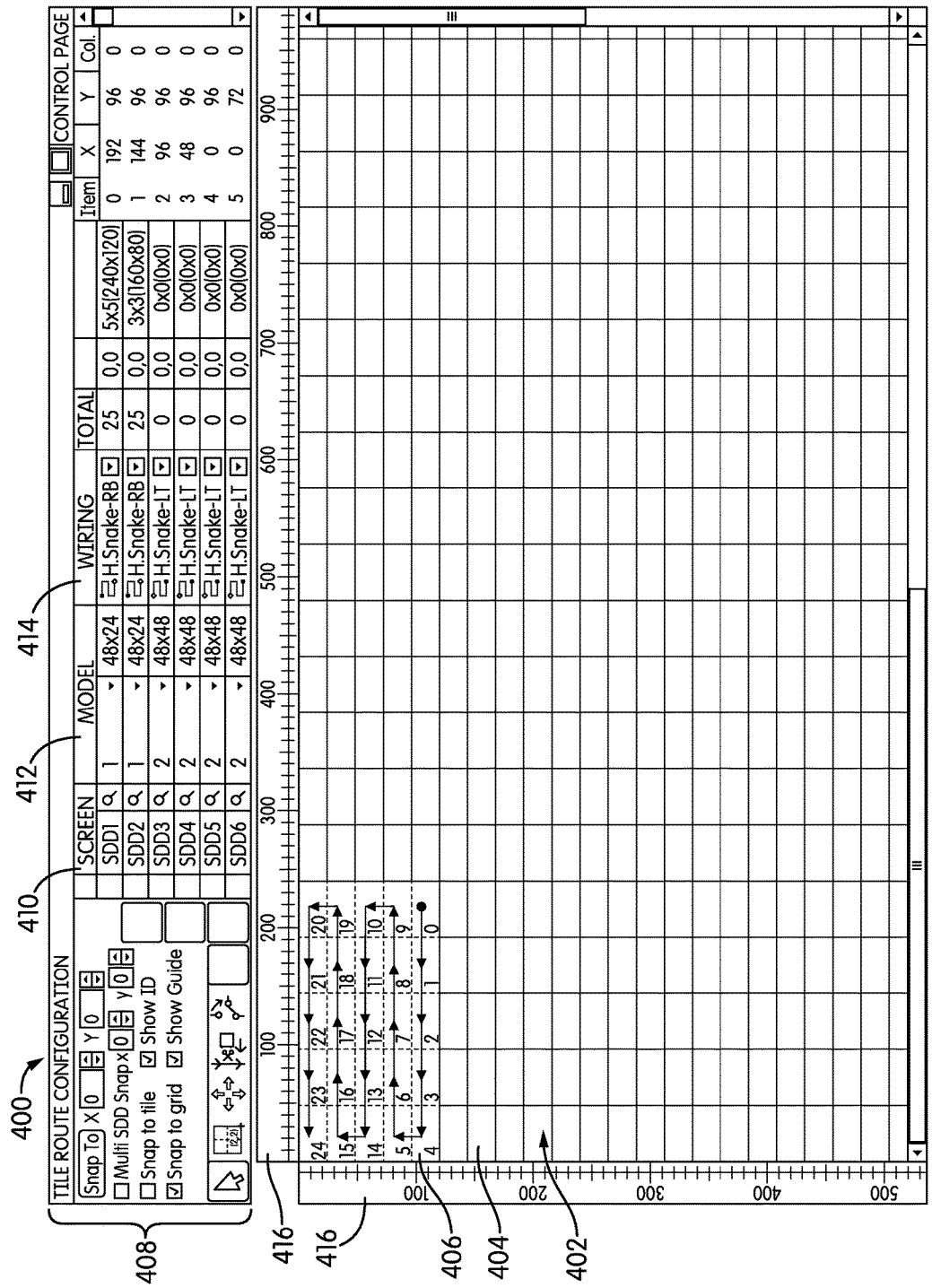
FIG. 15 is an illustration of a graphical user interface for manually configuring a display system.

As was described briefly above, this can be done using a graphical user interface. FIG. 15 is one example of a graphical user interface (GUI), generally indicated at 400, for manually configuring the layout and position of the display modules 14. The centerpiece of the GUI 400 is a grid 402 with each tile 404 in the grid 402 representing a single display module 14 in a display system 10. The user can select tiles 404 to indicate the overall size and shape of the display system 10 being used. In the illustrated embodiment, a user has selected a 5×5 grid 406, indicating a five module 14 by five module 14 display system 10. Using a set of what are essentially drawing tools 408, the user can then designate the wiring pattern and the positions of the modules 14 in the display system 10.

Overtop the grid 402, sets of indicator/selectors allow the user to select which display system 10 is being edited 410, the module 14 model and pixel dimensions 412, and the wiring pattern used to connect the modules 414. Rulers 416 adjacent the grid 402 provide dimensions, in this case, in pixels.

A graphical user interface like GUI 400 can be particularly helpful if the display system 10 is a nonstandard shape, e.g., non-rectangular. It can also be helpful if the nature and placement of the index sensors does not allow the configuration of the display system 10 to be determined precisely, or if there is an equipment failure that requires a manual reconfiguration.

This description uses the word "software." As used here, software refers to sets of machine-readable instructions on a non-transitory machine-readable medium interoperable with a machine to perform the described tasks. The software described here may be compiled or interpreted, and may be implemented in essentially any programming language or mix of programming languages.

While the invention has been described with respect to certain embodiments, the description is intended to be exemplary, rather than limiting. Modifications and changes may be made within the scope of the invention, which is defined by the appended claims.

What is claimed is:

1. A modular digital display system, comprising:
a modular framing system including a plurality of interconnected frames;
a corresponding plurality of interchangeable display modules, each of the display modules including a number of light-emitting diodes (LEDs) or LED assemblies, each of which serves as a pixel or element in the digital display system, one or more close-proximity locating or index sensors used to determine adjacency of each display module to one or more other ones of the plurality of display modules without direct physical contact of adjacent display modules to each other, and a structure configured and arranged to releasably attach the display module to one of the plurality of interconnected frames; and
a display controller connected to one of the plurality of display modules, wherein the plurality of display modules are connected together in series, wherein the display controller receives data through a serial connection from all of the plurality of display modules, including data from all of the one or more close-proximity locating or index sensors, and determines automatically the configuration and the locations of the interchangeable display modules without requiring a specific monitor identification number for any of the plurality of display modules before making such determination, allowing the display controller to cause each of the plurality of display modules to display a correct portion of a larger image.

2. The system of claim 1, wherein the close-proximity locating or index sensors are disposed along edges of the respective display modules.

3. The system of claim 1, wherein the close-proximity locating or index sensors are disposed on edges of a printed circuit board of the display modules on which LEDs or LED assemblies are mounted.

4. The system of claim 3, wherein the close-proximity locating or index sensors are sound or ultrasound sensors, infrared emitters/sensors, photodiodes, optical sensors, laser-based sensors, RFID sensors, near field communication (NFC)-based sensors, or inductive sensors.

5. The system of claim 4, wherein the close-proximity locating or index sensors are inductive sensors.

6. The system of claim 1, wherein the one or more close-proximity locating or index sensors comprise inductive sensors arranged such that at least one inductive emitter is present on two distinct sides of a printed circuit board (PCB) of the display modules on which LEDs or LED assemblies are mounted and at least one inductive receiver is present on another two distinct sides of the PCB.

7. The system of claim 1, wherein each of the plurality of display modules includes an integrated module controller with a network interface coupled to the display controller, such that the plurality of display modules form a communications network with the single display controller.

8. The system of claim 7, wherein the display controller is configured as a dynamic host configuration protocol (DHCP) server and assigns an Internet Protocol (IP) address to each of the plurality of display modules.

9. A display module, including a number of light-emitting diodes (LEDs) or LED assemblies, each of which serves as a pixel or element in a digital display system, the LEDs or LED assemblies being disposed on a printed circuit board (PCB);
one or more close-proximity locating or index sensors disposed along respective edges of the PCB to determine adjacency of the LEDs or LED assemblies;
an attachment structure adapted to releasably secure the display module to a modular frame; and
an integrated display controller that receives data from the one or more close-proximity locating or index sensors and automatically determines a configuration and a location of all of the LEDS or LED assemblies without direct physical contact of adjacent LEDS or LED assemblies to each other and without requiring a specific display module identification number for the display module, and that drives all of the LEDs or LED assemblies, the display controller including a network interface.

10. The module of claim 9, wherein the close-proximity locating or index sensors are sound or ultrasound sensors, infrared emitters/sensors, photodiodes, optical sensors, laser-based sensors, RFID sensors, near field communication (NFC)-based sensors, or inductive sensors.

11. The module of claim 10, wherein the close-proximity locating or index sensors are inductive sensors.

12. The module of claim 11, wherein the inductive sensors are arranged such that at least one inductive emitter is present on two distinct sides of the PCB and at least one inductive receiver is present on another two distinct sides of the PCB.

13. The module of claim 10, wherein the network interface comprises an Ethernet interface.

14. The module of claim 9, further comprising:
a first power and data cable adapted to carry both power and data signals; and
a port adapted to receive a second power and data cable.

15. A method for configuring and driving a modular digital display system, comprising:
receiving at a display controller that is connected to one of a plurality of interchangeable, interconnected display modules positional constraint data from close-proximity positional sensors of all of the display modules arranged to form a single display screen, each of the display modules having a plurality of light-emitting diodes (LEDs) or LED assemblies serving as pixels in the display system, the positional constraint data indicating whether or not each display module has adjacent display modules along particular edges without requiring direct physical contact of adjacent display modules;
automatically calculating through the display controller a position for each of the display modules relative to the other display modules based on the positional constraint through a serial connection from all of the display modules without requiring a specific monitor identification number for any of the display modules before making such a determination;
automatically setting one or more operating parameters describing a division of pixels among the plurality of modules using the display controller; and
using the display controller, sending image or video data to each of the plurality of display modules in accordance with the calculated positions and the one or more operating parameters such that the plurality of display modules correctly reproduces an image or video described by the image or video data.

16. The method of claim 15, wherein the plurality of display modules are connected in series to one another and to the display controller, and the positional constraint data includes an indication of position within the series.

17. The method of claim 15, wherein:
the display controller and the display modules include complementary network interfaces;
the display controller implements a dynamic host configuration protocol (DHCP) server; and
the method further comprises: through the display controller, automatically and dynamically assigning each of the plurality of display modules an Internet protocol (IP) address using the DHCP server.

18. The method of claim 17, wherein the step of sending image or video data comprises sending packets of individually-addressed data to the display modules according to their IP addresses, the position of each of the display modules, and the one or more operating parameters.

* * * * *